(12) United States Patent
Keyes

(10) Patent No.: US 10,421,232 B2
(45) Date of Patent: *Sep. 24, 2019

(54) METHOD OF INSTALLING A HEAT TUBE ON PRE-INSULATED PIPING

(71) Applicant: Thermacor Process, Inc., Fort Worth, TX (US)

(72) Inventor: Thomas Joseph Keyes, Fort Worth, TX (US)

(73) Assignee: Thermacor Process, Inc, Fort Worth, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/583,506

(22) Filed: May 1, 2017

(65) Prior Publication Data

US 2018/0311867 A1 Nov. 1, 2018

(51) Int. Cl.
*B29C 44/08* (2006.01)
*B29C 44/18* (2006.01)
(Continued)

(52) U.S. Cl.
CPC .......... *B29C 63/14* (2013.01); *B29C 44/1295* (2013.01); *B29C 44/18* (2013.01);
(Continued)

(58) Field of Classification Search
CPC ....... B29C 44/04; B29C 44/06; B29C 44/065; B29C 44/08; B29C 44/1228;
(Continued)

(56) References Cited

U.S. PATENT DOCUMENTS 6,547,908 B2 4/2003 Keyes
7,824,595 B2 11/2010 Appleby et al.
(Continued)

FOREIGN PATENT DOCUMENTS

DE 102005037183 B3 5/2007
EP 0967430 A1 12/1999
(Continued)

OTHER PUBLICATIONS

European Search from for EP 18186492.7, dated Sep. 26, 2016; 4 pages.
(Continued)

*Primary Examiner* — Michael A Tolin
(74) *Attorney, Agent, or Firm* — Whitaker Chalk Swindle & Schwartz PLLC; Charles Gunter

(57) ABSTRACT

A method is shown for installing a heat tube on a section of pre-insulated piping. A metal carrier pipe is covered with a first layer of foam insulation. Next, a wire brush is used to cut a longitudinal slot along the length of the pipe so that the pipe exterior surface is exposed from the insulation. A heat tube is then installed within the longitudinal slot, whereby the heat tube contacts the exterior surface of the metal carrier pipe. A second layer of foam insulation is then sprayed onto the exterior of the metal carrier pipe, covering the previously formed longitudinal slot and installed heat tube. A polyolefin coating is then applied over the insulation to form a protective outer jacket for the insulated pipe.

11 Claims, 3 Drawing Sheets

(51) Int. Cl.
| | |
|---|---|
| *F16L 53/38* | (2018.01) |
| *F16L 59/14* | (2006.01) |
| *B29C 63/14* | (2006.01) |
| *B29C 44/12* | (2006.01) |
| *B29C 65/00* | (2006.01) |
| *B32B 38/00* | (2006.01) |
| *B29D 23/00* | (2006.01) |
| *B29K 75/00* | (2006.01) |
| *B29K 105/20* | (2006.01) |
| *B29L 23/00* | (2006.01) |
| *B29K 105/04* | (2006.01) |
| *B29K 23/00* | (2006.01) |
| *B29K 27/06* | (2006.01) |
| *B29C 44/04* | (2006.01) |
| *B29C 44/56* | (2006.01) |
| *B29L 9/00* | (2006.01) |
| *B29K 705/00* | (2006.01) |
| *F16L 59/15* | (2006.01) |
| *B29C 48/151* | (2019.01) |

(52) U.S. Cl.
CPC .. B29C 66/02241 (2013.01); B29C 66/02245 (2013.01); B29D 23/001 (2013.01); B32B 38/0004 (2013.01); F16L 53/38 (2018.01); F16L 59/143 (2013.01); *B29C 44/04* (2013.01); *B29C 44/08* (2013.01); *B29C 44/5627* (2013.01); *B29C 48/151* (2019.02); *B29C 2793/0063* (2013.01); *B29K 2023/065* (2013.01); *B29K 2023/12* (2013.01); *B29K 2027/06* (2013.01); *B29K 2075/00* (2013.01); *B29K 2105/046* (2013.01); *B29K 2105/20* (2013.01); *B29K 2705/00* (2013.01); *B29K 2995/0015* (2013.01); *B29K 2995/0063* (2013.01); *B29L 2009/00* (2013.01); *B29L 2023/225* (2013.01); *B32B 2038/0016* (2013.01); *B32B 2597/00* (2013.01); *F16L 59/15* (2013.01)

(58) Field of Classification Search
CPC ... B29C 44/1295; B29C 44/18; B29C 44/367; B29C 44/5627; B29C 47/0064; B29C 47/021; B29C 48/0021; B29C 48/151; B29C 63/10; B29C 66/02241; B29C 66/02245; B29C 69/001; B29C 69/008; B29K 2023/065; B29K 2023/12; B29K 2027/06; B29K 2075/00; B29K 2105/046; B29K 2705/12; B29K 2995/0015; B29L 2009/00; B29L 2023/225; B32B 37/153; B32B 38/0004; B32B 2038/0016; B32B 2597/00; F16L 9/19; F16L 9/20; F16L 53/38; F16L 59/029; F16L 59/14; F16L 59/143
See application file for complete search history.

(56) References Cited

U.S. PATENT DOCUMENTS

| | | | |
|---|---|---|---|
| 9,556,709 | B2 | 1/2017 | Parman |
| 2001/0050110 | A1 | 12/2001 | Born et al. |
| 2011/0297360 | A1 | 12/2011 | Perry |
| 2015/0285409 | A1 | 10/2015 | Espinasse et al. |
| 2016/0161042 | A1 | 6/2016 | Green et al. |

FOREIGN PATENT DOCUMENTS

| | | | | |
|---|---|---|---|---|
| WO | 2004018924 | A1 | 3/2004 | |
| WO | 2012037374 | A1 | 3/2012 | |
| WO | WO-2016085477 | A1 * | 6/2016 | ............ G02B 6/502 |

OTHER PUBLICATIONS

Thermacor Process, Inc., Ferro-Therm HPDE Skin-Effect heating, Specification Guide, 2 pages, revised Oct. 17, 2006.
Chromalox, Precision Heated and Control, FAQS,2 pages, Jan. 13, 2011.
Perma-Pipe, Skin Effect Current Tracing, Brochure, 5 pages, copyright 2007.
Applicant's Statement to Prior Secret Commerical Practice, 1 page.

* cited by examiner

METHOD OF INSTALLING A HEAT TUBE ON PRE-INSULATED PIPING

BACKGROUND OF THE INVENTION

1. Field of the Invention

The present invention relates generally to fully bonded foam pre-insulated piping systems and, more specifically, to a method for installing a heat tube on such a pre-insulated pipeline.

2. Description of the Prior Art

Insulated pipelines are needed in a variety of situations. For example, distributed HVAC (heating, ventilation, and air conditioning) applications utilize chilled water for cooling and steam and hot water for heating. The chiller and boiler are typically contained in a central location and the chilled water and steam and hot water are distributed to other locations. For example, on a school campus the chiller and boiler may be located in a power plant building. The chilled water and steam are distributed to classrooms in separate buildings. A set of insulated pipelines is used to convey the chilled water from the chiller to other locations and back to the chiller. Another set of insulted pipelines is used to carry the steam or hot water from the boiler to the other locations and back to the boiler. It is necessary for the pipes to be insulated in order to retain the internal temperature of the medium being transported and keep heating and cooling losses at a minimum. The insulated pipelines are usually located underground.

So called "pre-insulated piping systems" of the type under consideration are conventional and commercially available. There are predominately two types of such pre-insulated piping systems in use: Class-A drainable dryable testable (DDT); and polyurethane or polyisocyanurate "fully bonded" foam systems. In the bonded type system, the foam and outer jacket, being bonded, do not move relative to the inner pipe. In the Class-A type system, on the other hand, the insulated inner pipe is designed to move independently of the associated outer jacket. In fact, there is an air gap between the inner pipe and outer carrier pipe in the class-A type system.

The present application is directed toward the bonded foam type system. These systems utilize a metal carrier pipe, typically of steel, to convey fluid, i.e., steam and/or super-heated water, where the fluid is at a different temperature as compared to the ambient environment. In the particular types of piping systems under consideration, the pipelines may also be used to convey process fluids, heating water and hydrocarbon products, for example. In any event, around the outside of the steel pipe is a layer of insulating foam such as, for example, a polyurethane foam or a polyisocyanurate foam. In the case of high temperature piping systems, the insulating foam serves to keep heat loss from the starting location of the pipeline to the ending location at a minimum. Around the outside of the foam is a thin jacket of thermoplastic material, such as high density polyethylene (HDPE). The plastic jacket protects the foam from mechanical damage and also provides a watertight seal to prevent corrosion of the steel pipe.

In the typical pre-insulated piping manufacturing process, the steel carrier pipe is typically rotated while a foam dispensing head passes down the length of the pipe applying the foam coating. Alternatively, a helical conveyor system may be used to rotate the pipe as it travels down the conveyor. In other known processes, an outer envelope is placed about the length of the inner carrier pipe and foam is then injected from one end into the annular area between the pipe exterior and the interior of the outer envelope.

The above type processes have been used for many years and are adequate for most types of pre-insulated piping systems. However, in some cases, it is desirable to install what is called a "heat tube" on the exterior of the inner steel carrier pipe. Heat tubes are used, for example, as a part of "heat tracing" systems. Heat tracing is the use of an externally applied heat source on a pipeline to compensate for heat losses through the thermal insulation. Heat tracing evolved because of the need to maintain the flow of low, medium and high temperature liquids through a pipeline, whatever the nature of the surrounding environment. These type systems are commonly used for temperature maintenance and freeze protection and in heating/reheating applications in the transport of process fluids, heating water and heavy petroleum products. The term "heat tube", as used in the discussion which follows, is also intended to cover other applications, such as where the tubes carry electrical wires or cables for other purposes than heat transfer. For purposes of explaining the method of the invention, however, an electric heat tracing system will be utilized.

Various types of heat tracing systems exist. However, electric heat tracing systems offer significant advantages. Generally speaking, electric heat tracing supplies only the heat necessary for the efficient flow of product through the pipeline, and only when required. Because electric tracing is easily controllable, temperature variance is minimized and operating costs are significantly reduced. Time consuming costly purging of the heat lines is also eliminated in many cases.

Whatever type of electric heat tracing system is, it is generally necessary to install the previously described "heat tube" on the exterior surface of the metal carrier pipe. The heat tube is typically a metal or plastic conduit or channel member which is used to contain the electrical cabling or wiring used in the system and to transfer heat to the inner metal carrier pipe, as will be described more fully in the description which follows. The installation of the heat tube on the exterior surface of the inner metal carrier pipe presents some challenges in the case of pre-insulated piping systems, however, due to the presence of the outer foam insulating layer and the outer protective jacket.

Thus, there continues to be a need for improvements in the pre-insulated piping manufacturing processes, particularly where a heat tube is to be installed for such purposes as an electric heat tracing system.

It is, therefore, an object of the present invention to provide a simple and cost effective process for installing such a heat tube on the exterior surface of the inner metal carrier pipe as a part of a pre-insulated piping system.

SUMMARY OF THE INVENTION

The present invention concerns a method for installing a heat tube on a section of pre-insulated piping. The pre-insulated piping is made up of first and second lengths of insulated and jacketed pipe, each having a joining end to be joined to an end of the other length. Each pipe length comprises an inner metal carrier pipe having an interior surface and an exterior surface, an envelope of foamed insulation surrounding the inner metal carrier pipe exterior surface, and an outer protective jacket surrounding the envelope of insulation. The joining ends of adjacent metal carrier pipe lengths are welded together to form fixed joints, whereby the adjacent pipe lengths provide a continuous length of fluid conduit for conveying fluids.

The preferred method of the invention comprises the steps of:

providing a metal carrier pipe having an exterior surface, an interior surface and a given length extending along a central longitudinal axis;

applying a first layer of foam insulation onto the exterior surface of the metal carrier pipe;

using a wire brush to cut a longitudinal slot through the first layer of foam insulation at one point on the circumference of the metal carrier pipe;

installing a metal or plastic heat tube within the longitudinal slot whereby the heat tube contacts the exterior surface of the metal carrier pipe;

applying a second layer of foam insulation onto the exterior of the metal carrier pipe, covering the previously formed longitudinal slot and installed heat tube;

installing a synthetic polymeric coating around the foam covered pipe to thereby form an outer protective jacket for the insulated pipe.

The lengths of insulated piping being joined can be used, for example, as a part of a pipeline conveying process fluids, heating water or petroleum products. The insulated pipes can be used as a part of an electric current tracing system which is used for temperature maintenance and freeze protection.

The preferred insulating foams are selected from the group consisting of polyurethane foams and polyisocyanurate foams. The carrier pipe being insulated is a metal pipe which is preferably a formed of steel of a given gauge. One preferred material for the outer protective jacket is a high density polyethylene jacket material.

Additional objects, features and advantages will be apparent in the written description which follows.

DETAILED DESCRIPTION OF THE INVENTION

Figure 1:
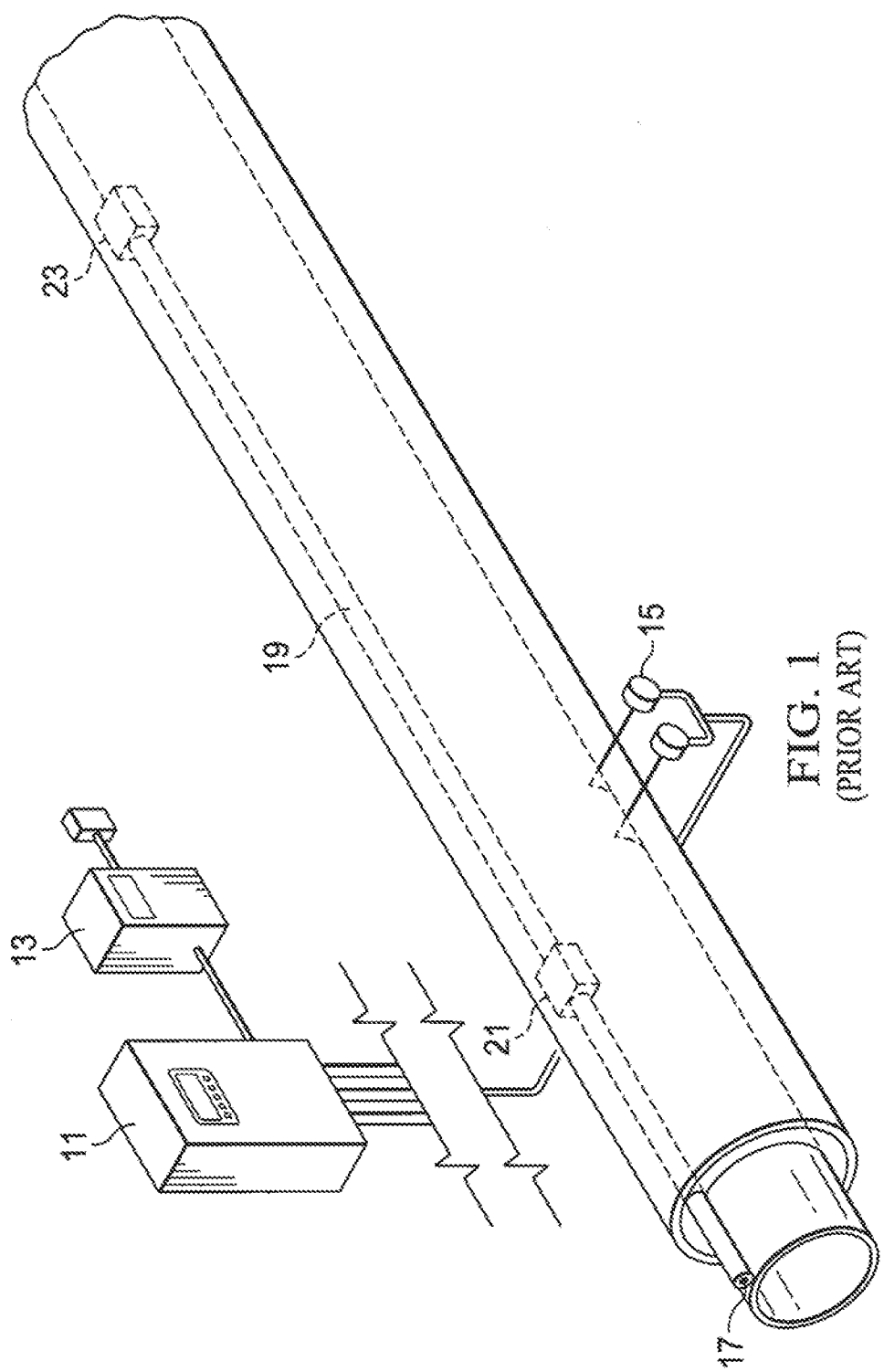
FIG. 1 is a simplified representation of a typical prior art pre-insulated electric heat traced steel piping installation.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

As has been briefly described, the particular type of piping system under consideration includes lengths of insulated and jacketed pre-insulated piping and, more specifically to a bonded foam pre-insulated piping system; i.e., the piping is made up of an inner carrier pipe having an interior surface and an exterior surface with an envelope of foamed insulation surrounding the inner pipe exterior surface. The envelope of foamed insulation can be, for example, an insulating material selected from the group consisting of polyurethane foams and high temperature polyisocyanurate foams. An outer protective jacket surrounds the envelope of insulation. The outer jacket can conveniently be formed from a polyolefin, such as a high density polyethylene. Each length of piping has a joining end for joining to an adjacent length of piping, whereby the adjacent lengths of piping provide a continuous length of fluid conduit for conveying high temperature fluids. The section of piping, as previously described, is installed in a piping system made up of other sections of piping.

One example of a commercially available pre-insulated piping system of the above type is the "HT-406" ™ High Temp Steel Piping System sold by Thermacor Process, Inc., 1670 Hicks Field Road East, Fort Worth, Tex. 76179. The following references, among others, teach the manufacture of such prior art systems: U.S. Pat. Nos. 3,793,4111; 4,084,842; and 4,221,405, all to Stonitsch et al.; as well as U.S. Pat. Nos. 6,547,908; 5,736,715; 7,037,557; 7,418,979; and 9,377,150, all assigned to Thermacor Process, Inc., the assignee of the present invention.

Any reference in this discussion to "sections" or "lengths" of pipe is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy metal material for the inner carrier pipes. The typical pipe diameters will be, for example, 4 inches to 12 inches. The insulating foam may be, for example, a suitable polyurethane foam. For high temperature systems, the surrounding envelope of foam insulation is typically formed of closed cell polyisocyanurate. The outer protective jacket in such systems can be formed of a suitable polyolefin, such as polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350°-400° F. and higher will be encountered. The expected operating temperature of the pipeline will determine the type of outer foam insulation utilized. For example, 250° F. is generally accepted as the present temperature limitation at which polyurethane foam is used in bonded foam systems. Temperatures above about 250° F. generally require the use of higher temperature foams, such as the previously mentioned polyisocyanurate foam. For example, a typical steam line might be conveying fluid at, for example, 250-350° F. In the case of the "heat tracing" systems of the type to be described, the piping system may be used, for example, as a part of a pipeline conveying process fluids, heating water or petroleum products. In such cases, the fluid being conveyed may be at a lower temperature, so that a polyurethane foam insulation is sufficient.

Several types of electric heat tracing methods are available, depending upon the end application. For example, one type is known as "skin effect tracing." Electric skin effect current tracing can be thought of as combining the engineering principles of "skin effect" and "proximity effect." Skin effect is an alternating current phenomena whereby AC current flows in the outer surface of a steel conductor. Proximity effect is an electromagnetic force which operates based upon the fact that equal currents in opposite directions attract. By placing the electric cable inside the heat tube, the current is drawn to a thin section of the heat tube inner wall. Heat generated from the current passes through the heat tube wall and into the steel carrier pipe by conduction. Exterior surfaces of skin effect current systems are electrically grounded. The voltage is impressed between the cable and the inner surface of the heat tube.

Skin effect heating allows a single point connection to provide heat for distances as long as 15 miles and even greater. Since electricity only flows on the inside of the heat tube, any residual voltage is eliminated. Since skin effect heating allows the heat applied to be evenly dissipated over long distances, an even temperature profile can be achieved.

One skin effect heating system is sold by Thermacor Process, Inc., Fort Worth, Tex., as the Ferro-Therm HDPE Skin Effect Heating System™. Exemplary Specifications, somewhat simplified for ease of explanation, include the following:

A. Carrier Pipe shall be steel ASTM A-53, Grade B, ERW (Type e) or seamless (Type S), standard weight Piping shall generally be provided in 40 foot double random lengths where feasible. Straight sections of factory insulated piping shall have 6" of exposed pipe at each end for field joint fabrication.

B. A steel heat tube (cylindrical conduit) of A106, Seamless Sch. 40 pipe will be installed along the entire length of the carrier pipe. This could also be a channel member to accomplish the same purpose.

C. An electric skin effect heat trace system will be custom designed for the specific application and installation conditions.

D. Polyurethane foam insulation shall be used to cover the carrier pipe in the annular space between the carrier pipe and the ultimate outer HDPE jacket with a minimum thickness of one inch. Insulation shall be rigid 90-95% closed cell polyurethane with a 2.0-3.0 pounds per cubic foot density and coefficient of thermal conductivity 9K-factor) of 0.14 and shall conform to ASTM C-591.

E. The outer jacketing material shall be extruded black, high density polyethylene (HDPE) manufactured in accordance with ASTM D-1248 having a minimum wall thickness of 150 mils.

The above specification extracts are intended to be exemplary only as the specifications may vary to some extent, depending upon the end application for the heat trace system. These specifications are intended to provide some understanding of the basic types of materials used in a typical system of the type under consideration.

Turning now to FIG. 1, there is shown in somewhat simplified fashion a heat tracing system, which in this case happens to be an "electric skin effect heat trace system." There are typically six main components in most skin effect systems. A control panel 11 is used to monitor the process temperature and to adjust the power input. A transformer 13 is used to regulate the voltage applied to the system. Various temperature sensors 15 are used to monitor the process temperatures. Skin effect electrical wires or cabling 17 are used to carry the voltage over the length of the pipeline system. Tubing or channeling 19 provides protection for the electrical wires 17 and dissipates the heat energy to the pipeline. Junction boxes, such as pull box 21 and end termination box 23 are used for wire connection and wire pulling points.

This somewhat schematic illustration of a typical skin effect heat tracing system is intended to be exemplary only of one type of heat traced piping system. However, for whatever type heat traced system happens to be under consideration, there is generally the need to provide a "heat tube" to house the various electrical wires or cabling used in the system. FIGS. 2-6 which follow illustrate the improved method of the invention which is used to install such a heat tube on a section of pre-insulated piping.

Figure 2:
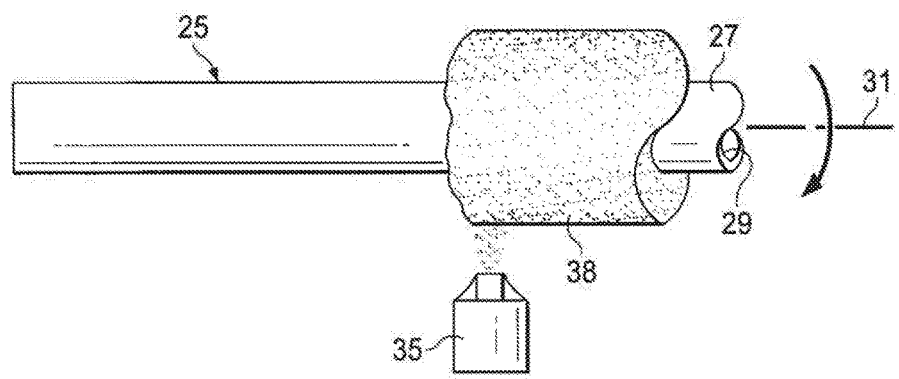
FIG. 2 is a simplified, schematic view of the first step in the manufacturing process of the invention in which an inner metal carrier pipe is coated with a layer of foam insulation.

Turning to FIG. 2, there is shown, in simplified fashion, the first step in the manufacturing process of the invention. The method is used for installing a heat tube on a section of pre-insulated piping where the piping is made up of first and second lengths of insulated and jacketed pipe, each having a joining end to be joined to an end of the other length. Each pipe length comprises an inner metal carrier pipe having an interior surface and an exterior surface. An envelope of foamed insulation surrounds the inner metal carrier pipe exterior surface, and an outer protective jacket surrounds the envelope of insulation. The joining ends of adjacent metal carrier pipe lengths are eventually welded together to form fixed joints, whereby the adjacent pipe lengths provide a continuous length of fluid conduit for conveying fluids, as has been described.

In the first step of the method illustrated in FIG. 2, a section of steel carrier pipe 25 has an exterior surface 27, an interior surface 29 and a given length ("l" in FIG. 3) extending along a central longitudinal axis 31. The carrier pipe is placed on a helical conveyor system which rotates the pipe as it translates down the conveyor. A fixed foam dispensing head 35 sprays a layer of insulating foam 38 on the carrier pipe as it passes through the spray head path. As has been discussed, this might be a polyurethane foam sprayed to a depth of, for example, one inch thick. This part of the process is conventional and will be familiar to those skilled in the relevant arts.

The first layer of insulating foam will generally be sprayed to a depth which corresponds approximately with the height of the heat tube to be installed later. The layer of foam insulation is allowed to cure to a given radial thickness to thereby form a foam insulated pipe. It may be necessary to utilize more than one dispensing head 35, for example, one head above the pipe and one head below the pipe for evenly injecting foaming material as the heads move down the length of the rotating pipe.

Figure 3:
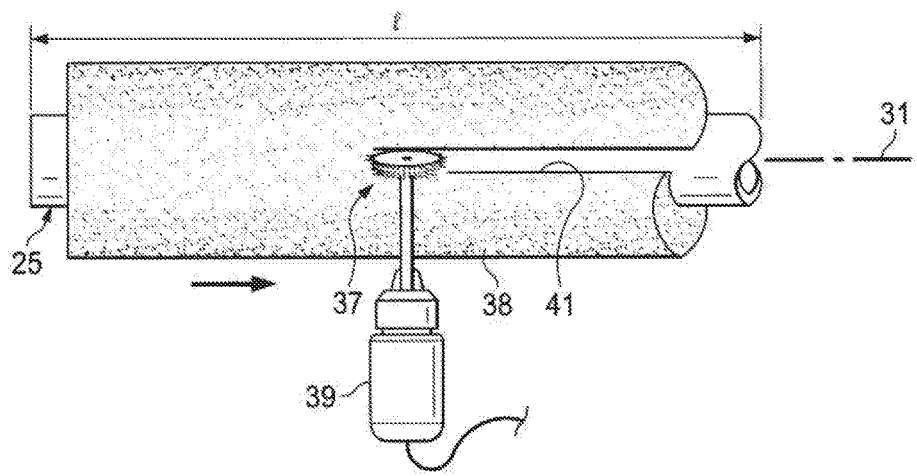
FIG. 3 is a simplified view, similar to FIG. 2, showing the next step in the process in which a wire electric brush is used to cut a longitudinal slot in the previously applied layer of foam insulation.

In the next step in the method, shown in FIG. 3, a wire brush 37 is mounted in a suitable jig fixture 39 on the side of the foam insulated pipe 25. The pipe 25 is drawn past the wire brush 37 in a linear direction of travel to thereby cut a longitudinal slot 41 through the first layer of foam insulation at one point on the circumference of the steel carrier pipe, thereby exposing the exterior surface 27 of the steel carrier pipe 25. The slot may be, for example, about one inch by one inch in dimension. The wire brush can be something as simple as a typical wire wheel brush mounted on an electric drill body. Suitable wire wheels and drill bodies are available at Home Depot®, Lowes® and similar stores.

Figure 4:
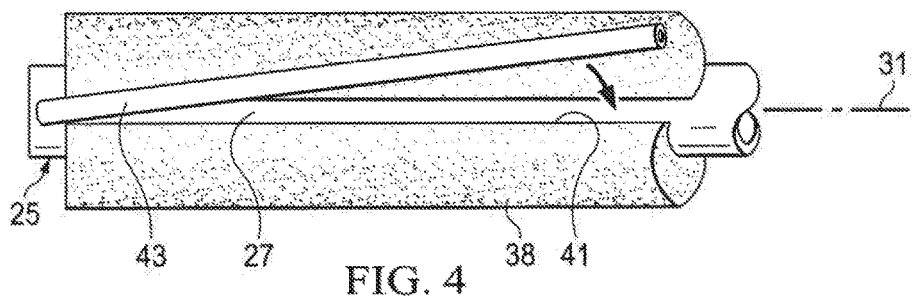
FIG. 4 is a view of the next step in the process of the invention in which a steel heat tube is installed in the previously cut slot.

FIG. 4 illustrates the next step in the method in which a metal or plastic heat tube 43 is installed within the longitudinal slot 41, whereby the heat tube 43 contacts the exposed exterior surface 27 of the metal carrier pipe 25. The heat tube 43 may be temporarily affixed to the pipe exterior surface in some manner, but it is typically not necessary to weld the heat tube in place. The heat tube 43 is shown as being a cylindrical conduit in the drawings, but it will be understood that the heat tube could have other shapes, such as a square or rectangular channel member, for example.

Figure 5:
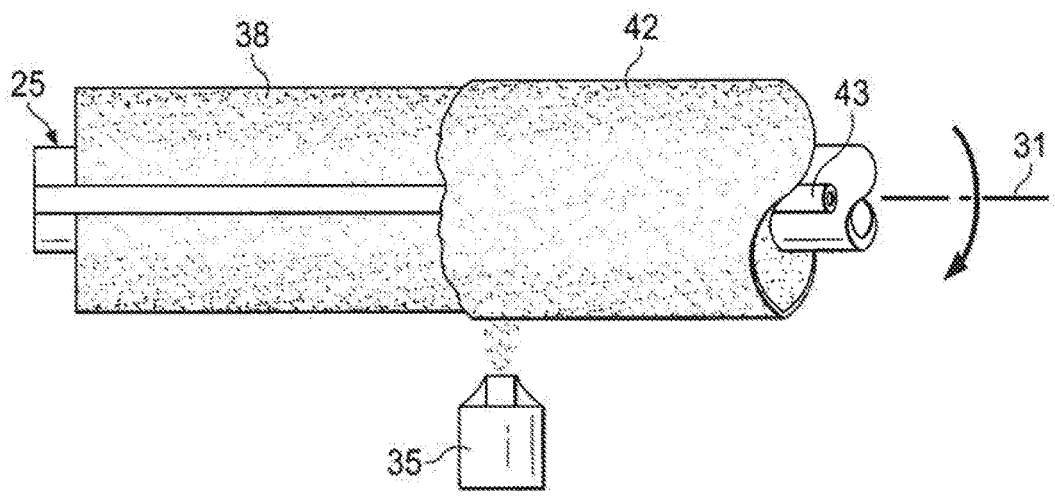
FIG. 5 is illustrates the next step in the process in which an additional layer of foam insulation is applied to the partly insulated pipe, covering the steel heat tube and longitudinal slot.

FIG. 5 illustrates the next step in the method in which a second layer of foam insulation 42 is sprayed onto the exterior of the metal carrier pipe and first layer of foam insulation 38, thereby covering the previously formed longitudinal slot 41 and installed heat tube 43.

Figure 6:
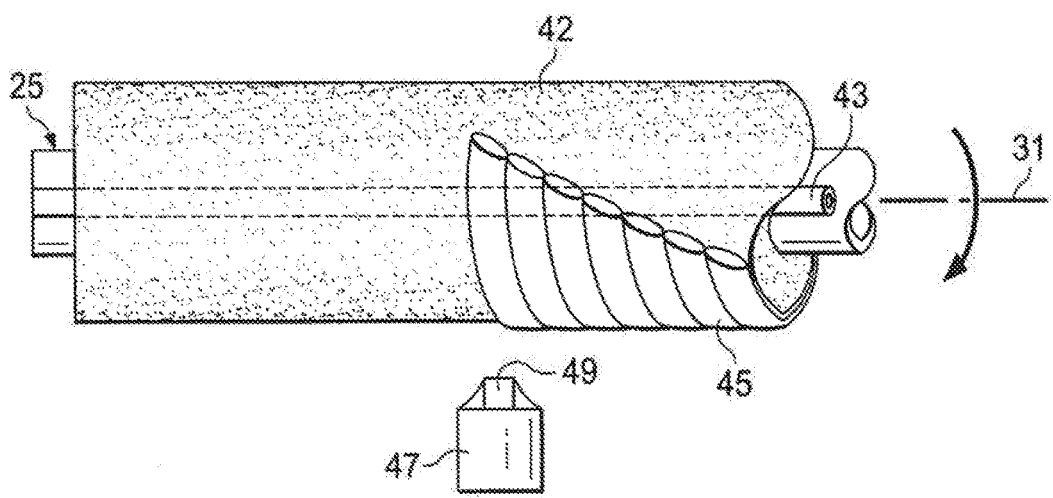
FIG. 6 is illustrates the final step in the process of the invention in which an outer protective synthetic jacket is applied about the exterior of the previously insulated pipe and steel heat tube.

In the final step in the process, shown in FIG. 6, an outer protective synthetic jacket 45 is applied to the carrier pipe and two layers of foam insulation. This can be accomplished, as by applying a polyolefin coating (HDPE) around the insulated pipe to thereby form an outer protective jacket for the insulated pipe. In the example illustrated in FIG. 6, an extruder head 47 extrudes the HDPE coating from an extrusion nozzle 49 as the extrusion head passes longitudinally along the exterior of the pipe. Alternatively, the extruder head can be stationary with the pipe being placed on a helical conveyor system which rotates the pipe as it translates down the conveyor.

An invention has been provided with several advantages. The method of the invention can be used to manufacture a length of pre-insulated piping where the lengths of insulated piping being joined are part of a pipeline conveying, for example, process fluids, heating water and petroleum products. The process accommodates the installation of a heat tube of the type used in a heat tracing system used for temperature maintenance and freeze protection. The process is simple in nature and economical to practice requiring the addition of only simple hand tool type implements.

While the invention has been shown in only one of its forms, it is not thus limited but is susceptible to various change and modifications without departing from the spirit thereof.

What is claimed is:

1. A method for installing a heat tube on a pre-insulated pipe, the method comprising the steps of:
   providing a metal carrier pipe having an exterior surface, an interior surface and a given length extending along a central longitudinal axis;
   applying a first layer of foam insulation onto the exterior surface of the metal carrier pipe to form a pre-insulated pipe;
   using a wire brush to cut a longitudinal slot through the first layer of foam insulation of the pre-insulated pipe;
   installing a heat tube within the longitudinal slot whereby the heat tube contacts the exterior surface of the metal carrier pipe;
   applying a second layer of foam insulation onto the exterior of the metal carrier pipe, covering the previously formed longitudinal slot and installed heat tube to form an insulated pipe;
   applying a polyolefin coating around at least a portion of the insulated pipe to thereby form a finished insulated pipe having an outer protective jacket.

2. The method of claim 1, wherein the heat tube is formed of a material selected from the group consisting of metals and plastics.

3. The method of claim 1, wherein the first and second layers of foam insulation are formed from a material selected from the group consisting of polyurethane foams and polyisocyanurate foam.

4. The method of claim 3, wherein the finished insulated pipe may be used as part of a pipeline for conveying process fluids, heating water or petroleum products.

5. The method of claim 4, wherein the metal carrier pipe is a metal pipe formed of steel of a given gauge.

6. The method of claim 4, wherein the outer protective jacket is formed from a high density polyethylene jacket material.

7. A method for installing a heat tube on a pre-insulated pipe, the method comprising the steps of:
   providing a steel carrier pipe having an exterior surface, an interior surface and a given length extending along a central longitudinal axis;
   rotating the steel carrier pipe while spraying a first layer of foam insulation onto the exterior surface of the steel carrier pipe and allowing the first layer of foam insulation to cure to a given radial thickness to thereby form a pre-insulated pipe;
   mounting a wire brush in a suitable fixture and moving the pre-insulated pipe past the fixture in linear fashion, whereby the wire brush cuts a longitudinal slot through the first layer of foam insulation along the length of the pre-insulated pipe, exposing the exterior surface of the steel carrier pipe;
   installing a heat tube within the longitudinal slot whereby the heat tube contacts the exterior surface of the steel carrier pipe;
   spraying a second layer of foam insulation onto the exterior of the steel carrier pipe, thereby covering the previously formed longitudinal slot and installed heat tube to form an insulated pipe;
   applying a polyolefin coating around the insulated pipe to thereby form a finished insulated pipe having an outer protective jacket.

8. The method of claim 7, wherein the first and second layers of foam insulation are formed from a material selected from the group consisting of polyurethane foams and polyisocyanurate foam.

9. The method of claim 7, wherein the finished insulated pipe may be used as part of a pipeline for conveying process fluids, heating water or petroleum products.

10. The method of claim 9, wherein the outer protective jacket is formed in the step of applying a polyolefin coating by spirally wrapping a polyolefin material about the insulated pipe.

11. The method of claim 7, wherein the outer protective jacket is formed from a high density polyethylene jacket material.

* * * * *